United States Patent
Wang

(10) Patent No.: US 8,689,721 B2
(45) Date of Patent: Apr. 8, 2014

(54) VERTICALLY INSTALLED SPAR AND CONSTRUCTION METHODS

(75) Inventor: Jin Wang, Houston, TX (US)

(73) Assignee: Jin Wang, Houston, TX (US)

( * ) Notice: Subject to any disclaimer, the term of this patent is extended or adjusted under 35 U.S.C. 154(b) by 289 days.

(21) Appl. No.: 13/025,157

(22) Filed: Feb. 11, 2011

(65) Prior Publication Data

US 2011/0214596 A1    Sep. 8, 2011

Related U.S. Application Data

(60) Provisional application No. 61/310,473, filed on Mar. 4, 2010.

(51) Int. Cl.
*B63B 35/44* (2006.01)

(52) U.S. Cl.
USPC .......................................... 114/264; 114/266

(58) Field of Classification Search
USPC ........... 114/61.14, 61.15, 264, 265, 266, 267;
290/55; 405/198, 203, 209, 224;
414/137.5, 137.7, 138.1, 139.7, 139.8,
414/803
See application file for complete search history.

(56) References Cited

U.S. PATENT DOCUMENTS

| | | | |
|---|---|---|---|
| 4,702,321 A | 10/1987 | Horton | |
| 4,913,591 A * | 4/1990 | Steele | 405/196 |
| 6,171,028 B1 * | 1/2001 | Van Gelder | 405/209 |
| 6,263,824 B1 | 7/2001 | Balint et al. | |
| 6,431,107 B1 * | 8/2002 | Byle | 114/264 |
| 7,234,409 B2 * | 6/2007 | Hansen | 114/258 |
| D567,176 S | 4/2008 | Borgen | |
| 7,456,515 B2 * | 11/2008 | Nielsen | 290/55 |
| 7,612,462 B2 | 11/2009 | Viterna | |
| 7,819,073 B2 | 10/2010 | Sveen | |
| 8,169,099 B2 * | 5/2012 | Roznitsky et al. | 290/44 |
| 2004/0042876 A1 * | 3/2004 | Seegers et al. | 414/137.7 |
| 2004/0169376 A1 * | 9/2004 | Ruer et al. | 290/55 |

FOREIGN PATENT DOCUMENTS

WO    WO 9943956 A1 *    9/1999

OTHER PUBLICATIONS

C.P. Butterfield, W. Musical, and J. Jonkman, "Overview of Offshore Wind Technology", Conference Paper, NREL/CP-500-42252, Oct. 2007.
A. Neville, "Top Plants: Hywind Floating Wind Turbine, North Sea, Norway", *Power Magazine*, Dec. 2009.

* cited by examiner

*Primary Examiner* — Daniel V Venne
*Assistant Examiner* — Anthony Wiest

(57) ABSTRACT

A vertically installed Spar-type floater for offshore wind turbine and related construction method are provided. The floating system is a gravity stabilized deep-draft floater including a plurality of vertically extending columns, each column containing a ballast material; a ballast tank coupled to the lower end of each of the columns; a top deck having a plurality of through-bores approximate its periphery coupled to the upper end of each of the columns; a wind turbine assembly supported by the top deck at the center; a plurality of mooring lines linking the floating system to the sea floor. The floating system has a temporary vertically towing configuration which allows the entire floating wind turbine system to be assembled at a quayside and towed vertically to an offshore site, and self-installed into operating configuration.

3 Claims, 16 Drawing Sheets

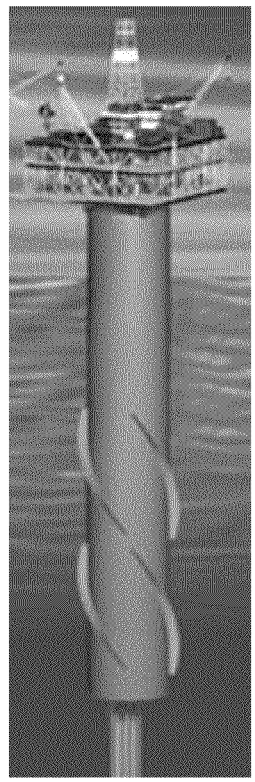
FIG. 1 – Prior Art
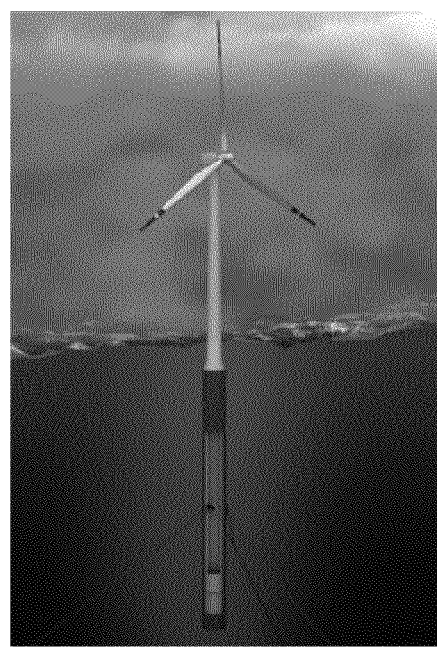
FIG. 2 – Prior Art

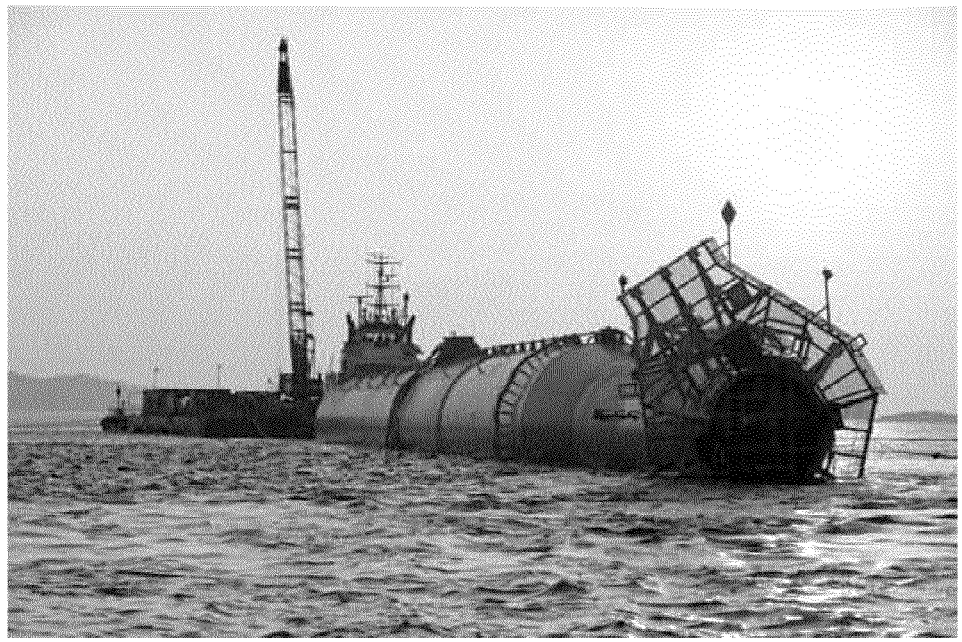
FIG. 3 – Prior Art
FIG. 4 – Prior Art

Step I

Step V

Step VI

Step VII

Step VIII

VERTICALLY INSTALLED SPAR AND CONSTRUCTION METHODS

CROSS-REFERENCE TO RELATED APPLICATIONS

This present application claims the benefits of priority from the U.S. provisional application No. 61/310, 473, entitled "VERTICALLY INSTALLED SPAR FOR OFFSHORE WIND TURBINES AND CONSTRUCTION METHODS", filed on Mar. 4, 2010.

STATEMENT REGARDING FEDERALLY SPONSORED RESEARCH OR DEVELOPMENT

Not applicable.

REFERENCES

US Patent Documents (1) U.S. Pat. No. 4,702,321, Horton, October 1987
(2) U.S. Pat. No. 6,263,824 B1, Balint, July 2001
(3) U.S. Pat. No. 4,913,591, Steele, April 1990
(4) U.S. D567,176S, Borgen, April 2008
(5) U.S. Pat. No. 7,612,462 B2, Viterna, November 2009
(6) U.S. Pat. No. 7,819,073 B2, Sveen, October 2010

Other Publications (1) C. P. Butterfield, W. Musial, and J. Jonkman, "Overview of Offshore Wind Technology", Conference Paper, NREL/CP-500-42252, October, 2007
(2) A. Neville, "Top Plants: Hywind Floating Wind Turbine, North Sea, Norway", *Power Magazine*, December, 2009

FIELD OF INVENTION

Embodiments of present invention relate generally to the field of floating offshore wind turbines for offshore wind power generation. More particularly, embodiments of present invention relate to a vertically installed Spar-type deepwater floating wind turbine system, which can be vertically assembled at a quayside including the buoyant sub-structure system together with the wind turbine tower and rotor blades mounted in upright position, towed at sea and self-installed vertically at a deepwater offshore wind farm site.

BACKGROUND OF INVENTION

The present invention relates to a Spar-type floating wind turbine installation for offshore wind power generation. More particularly, the present invention relates to a self-installable Spar-type deepwater floating wind turbine system without using a large expensive floating heavy lift crane vessel for offshore installation of the wind turbine assembly.

Conventionally, a category of deep-draft caisson floaters, most commonly known as "Spar", has been used for deepwater oil and gas drilling and production as illustrated in FIG. 1. A distinctive characteristic of a Spar-type floater is that it conventionally has a single slender buoyant body or hull extending deeply in the water normally in the range of 100 to 200 meters depth. Another distinctive feature of a Spar-type floater is that it is gravity-stabilized by maintaining its vertical center of gravity lower than its center of buoyancy. More recently, as illustrated in FIG. 2, the Spar concept has also been used as a floating wind turbine installation for offshore wind power generation in deep water regions with water depth greater than 100 meters where the wind energy is more abundant and stable than in shallow water regions or on land. More particularly, a conventional Spar-type offshore wind turbine floater is built onshore and towed at sea in horizontal position as illustrated in FIG. 3, and upended to vertical position in deepwater for installing the turbine tower and rotor blades assembly by a large floating heavy lift crane vessel as illustrated in FIG. 4. Such conventional Spar-type offshore wind turbine floater and associated offshore installation method is considered cost prohibitive for practical large scale deployment at a deepwater wind farm site. To reduce the high cost due to offshore horizontal tow and heavy lift assembly of the wind turbine system, a conventional Spar-type offshore wind floater in theory could be vertically assembled together with the wind turbine tower and rotor blades mounted in upright position at a quayside provided the water depth is in excess of 100 meters from the quay throughout to the offshore wind farm site. However, there are very few locations in the world, mostly in offshore Norway, with such deep water depth for practical applications.

The present invention aims to provide a novel configuration of a Spar-type wind turbine floater with the feature of gravity-stabilized by maintaining its vertical center of gravity lower than the center of buoyancy for wind power generation, as well as enables the floating wind turbine system to be vertically constructed and assembled at quayside, towed at sea to offshore wind farm site and self-installed with significantly less cost than a conventional Spar-type wind turbine floater.

SUMMARY OF INVENTION

A vertically installed Spar-type floating wind turbine system for offshore wind power generation and related construction methods are provided. The present invention contemplates a floating wind turbine system that can be assembled vertically at a quayside and towed at sea together with a wind turbine assembly mounted on the floater in upright position, and self-installed vertically at a deepwater offshore wind farm site without using a large floating heavy lift crane vessel, thus provide a cost-effective solution for large scale deployment of floating wind turbine systems.

BRIEF DESCRIPTION OF DRAWINGS

FIG. 1 illustrates a prior art of a Spar-type floater used in oil and gas drilling production according to some embodiments of the present invention.

FIG. 2 illustrates a prior art of a Spar-type floater used in offshore wind power generation according to some embodiments of the present invention.

FIG. 3 illustrates a prior art of horizontal towing of a Spar-type wind turbine floater according to some embodiments of the present invention.

FIG. 4 illustrates a prior art of installing a wind turbine tower and rotor blades onto a Spar-type wind turbine floater by a large heavy lift crane vessel according to some embodiments of the present invention.

DETAILED DESCRIPTION OF THE PREFERRED EMBODIMENT

Preferred embodiments of the present invention are illustrated in FIG. 5 through 12. Detailed descriptions are as follows.

Figure 5:
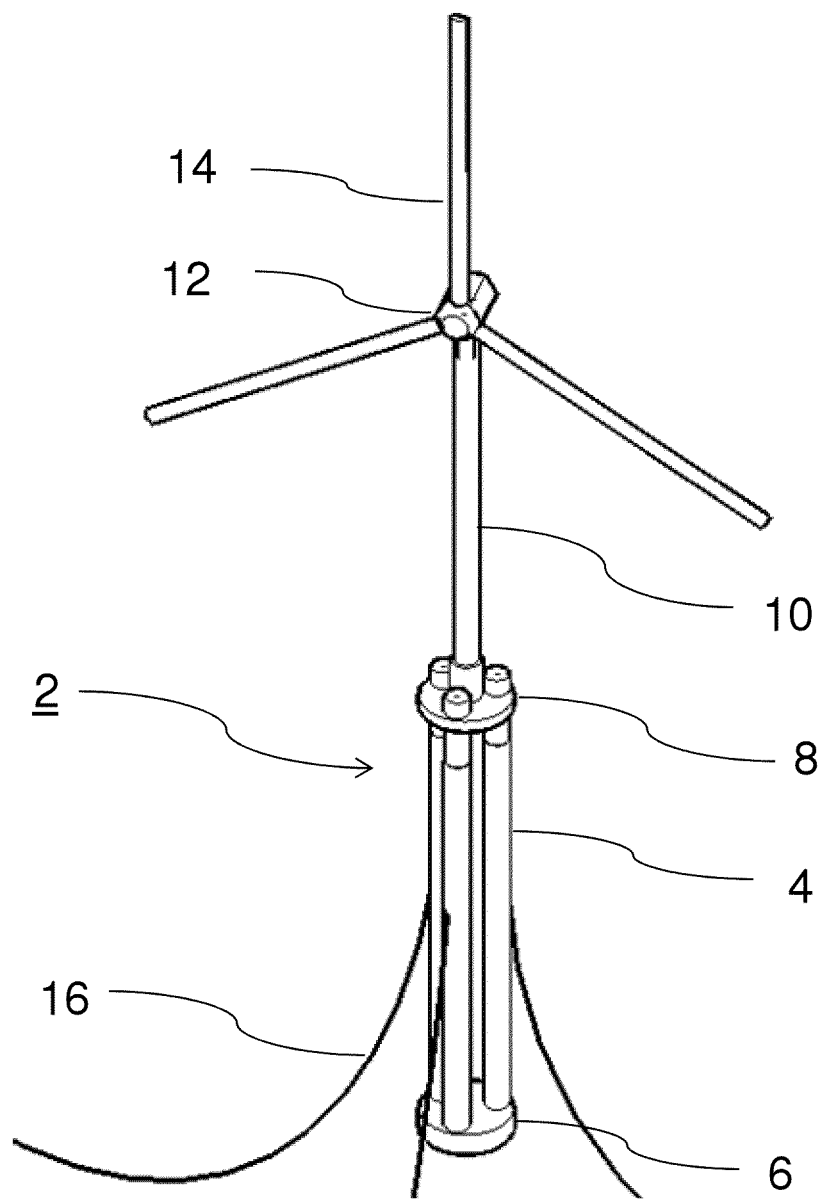
FIG. 5 illustrates a perspective view of the present invention of a vertically installed Spar-type floating wind turbine system in permanent operating configuration or in-service condition for wind power generation according to some embodiments of the present invention.

With reference to FIG. 5, a floating wind turbine system 2 in wind power generating configuration or in-service condition includes a plurality of closely spaced vertically extending columns 4; a bottom ballast tank 6 coupled to one end (bottom end) of each of the columns 4; a top deck 8 coupled to the other end (top end) of each of the columns 4; a wind turbine tower assembly, comprising of a tower 10, which coupled to a nacelle 12 and rotor blades 14 at the top end, and supported by the top deck 8 on the bottom end; and a plurality of mooring lines 16 linking the said floating wind turbine system 2 to the sea floor. The floating wind turbine system 2 has a preferred range of in-service draft of 80 to 120 meters measured from the ballast tank 6 to the top deck 8 linked by the vertically extending columns 4. The columns 4 are empty, i.e. buoyant and the bottom segment of the column may contain a ballast material most commonly sea water or solid material. With respect to the columns 4, the preferred number of columns is three which are closely spaced with distance between any two columns within 2 to 4 times of the diameter of the column, and the preferred cross-section is circular which may be of same diameter throughout or of different diameters at different elevations. The ballast tank 6 located at the bottom of the floater contains a ballast material most commonly of high density solid material, such as iron ore or sand or concrete and is flooded in the wind power generating configuration in the preferred embodiment.

The top deck 8 preferably has a round shape with diameter approximately 5 to 10 times of the diameter of the columns 4 and is above the sea level. The main function of the top deck 8 is to provide support to the turbine tower 10 which has one end (top end) coupled to the nacelle 12 and the other end (bottom end) coupled to a structural support located at the center of the top deck 8. The ballast tank 6 and the top deck 8 can have various configurations which are, but not limited to, circular, triangular, rectangular, square, hexagon, octagon or star, or other non-regular shapes.

Figure 6:
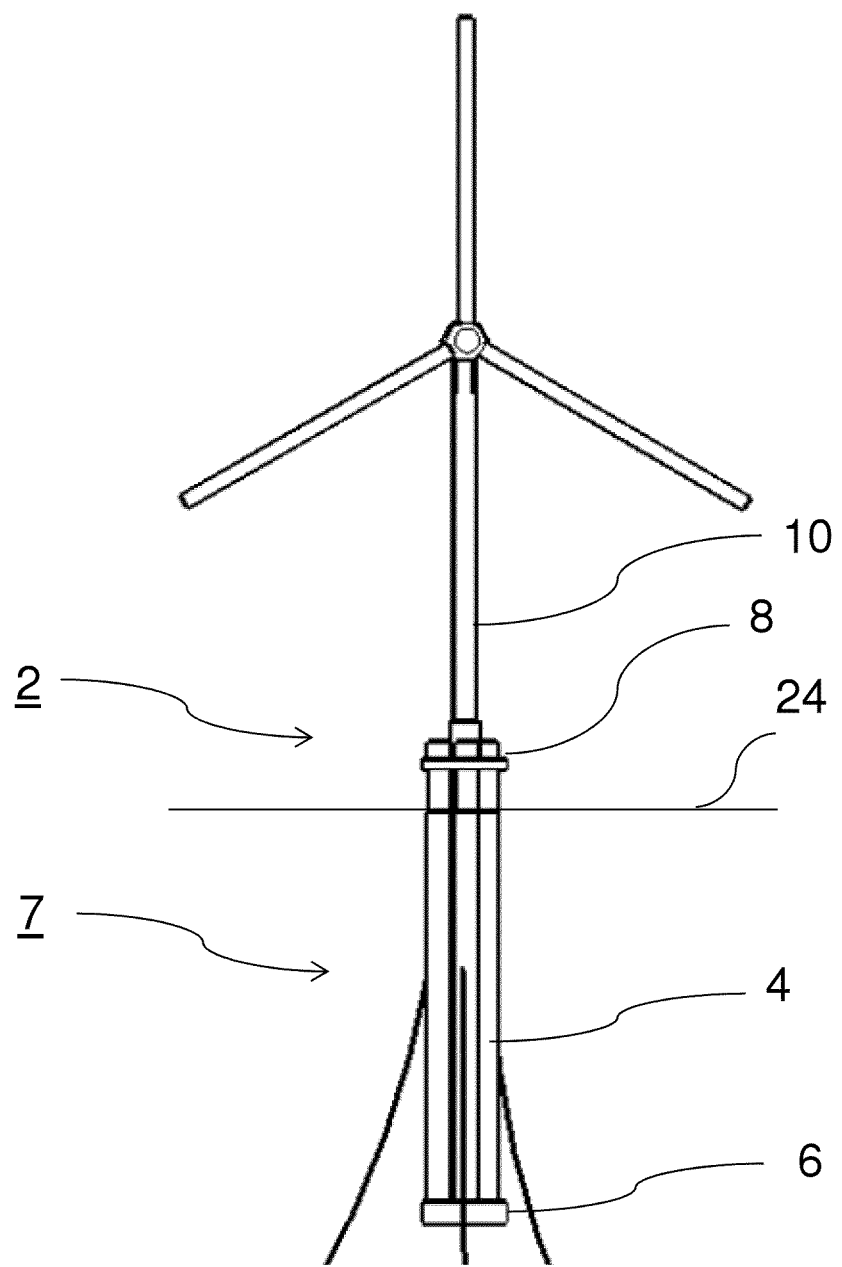
FIG. 6 illustrates a front view of the vertically installed Spar-type floating wind turbine system in permanent wind-generating configuration in which the floater hull comprising the extending columns and the ballast tank is shown having a deep draft according to some embodiments of the present invention.

With reference to FIG. 6, which illustrates a front view of the floating wind turbine system 2 in wind power generation configuration or in-service condition, in which the water level 24 for in-service condition is approximately 80 to 100 meters above the bottom of the ballast tank 6 with approximately 90% of the extending columns 4 vertically submerged below the water level 24. The extending columns 4 and the ballast tank 6 comprise the floater hull 7, which provides buoyancy and stability for the floating wind turbine system 2. More particularly, the ballast tank 6 contains a large quantity of solid ballast material, typically with weight in excess of 3 to 5 times of the weight of the floater hull 7, in order to cause the center of gravity of the floating wind turbine system 2 to be below its center of buoyancy for stability. Thus, the floating wind turbine system 2, while distinctively different from a conventional "Spar", exhibits the key characteristics of a Spar-type floater, more particularly, a slender buoyant body or hull extending deeply in the water normally in the range of 100 to 200 meters depth, and gravity-stabilized by maintaining its vertical center of gravity lower than its center of buoyancy.

Figure 7:
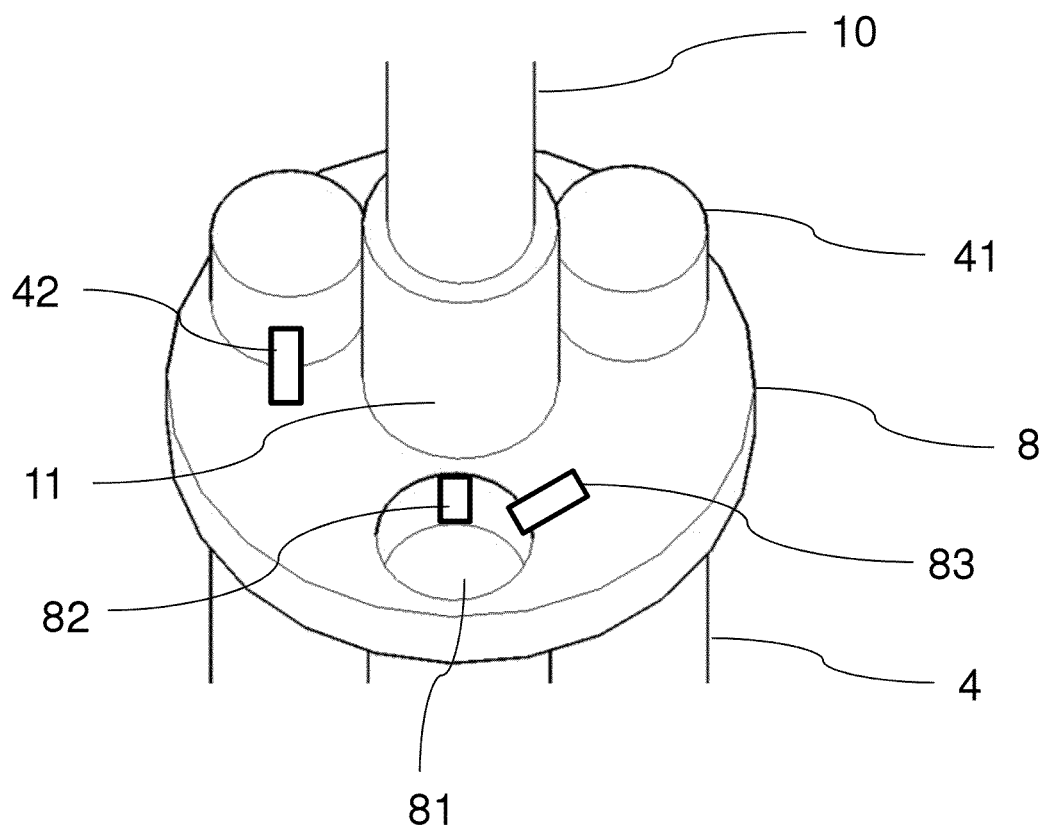
FIG. 7 illustrates an enlarged view of the top deck of the floating wind turbine system in permanent wind-generating configuration including a plurality of through-bores approximate its periphery, deck guiding and locking system, and column guiding system according to some embodiments of the present invention.

With reference to FIG. 7, which illustrates an detailed view of the area around the top deck 8, the preferred top deck 8 configuration has a plurality of periphery through-bores 81 (column omitted for clarity), at which the top part of the column 41 is connected to the top deck 8 for in-service condition, a support structure 11 which has a preferred location at the center of the top deck 8. Connections between the columns 4 and the top deck 8 can be of welded or grouted by means of concrete. Connections between the turbine tower 10 and the support structure 11 on the top deck 8 can be of bolted, or welded or grouted by means of concrete. The function of the top deck through-bores 81, whose diameter is typically 1 to 2 inches larger than the diameter of the column, is to allow the columns 4 to move through it in an up and down fashion. For example, the columns 4 can be retracted upward for quayside assembly and sea-towing, and lowered by gravity to depth for in-service configuration when at the offshore wind farm installation site. Each of the through-bores 81 having diameter of the through-bore 1 to 2 inches greater than the column diameter can have a deck guiding system 82, comprising of a plurality of pads of elastic material with thickness of 1 to 2 inches coupled to the wall of the through-bores 81. The top deck 8 can have a plurality of deck locking and release mechanism 83 at the through-bores 81, which can move in the radial direction of the through-bore, thus controlling the position of the columns 4 during the offshore installation process of the floating wind turbine system 2.

Figure 8:
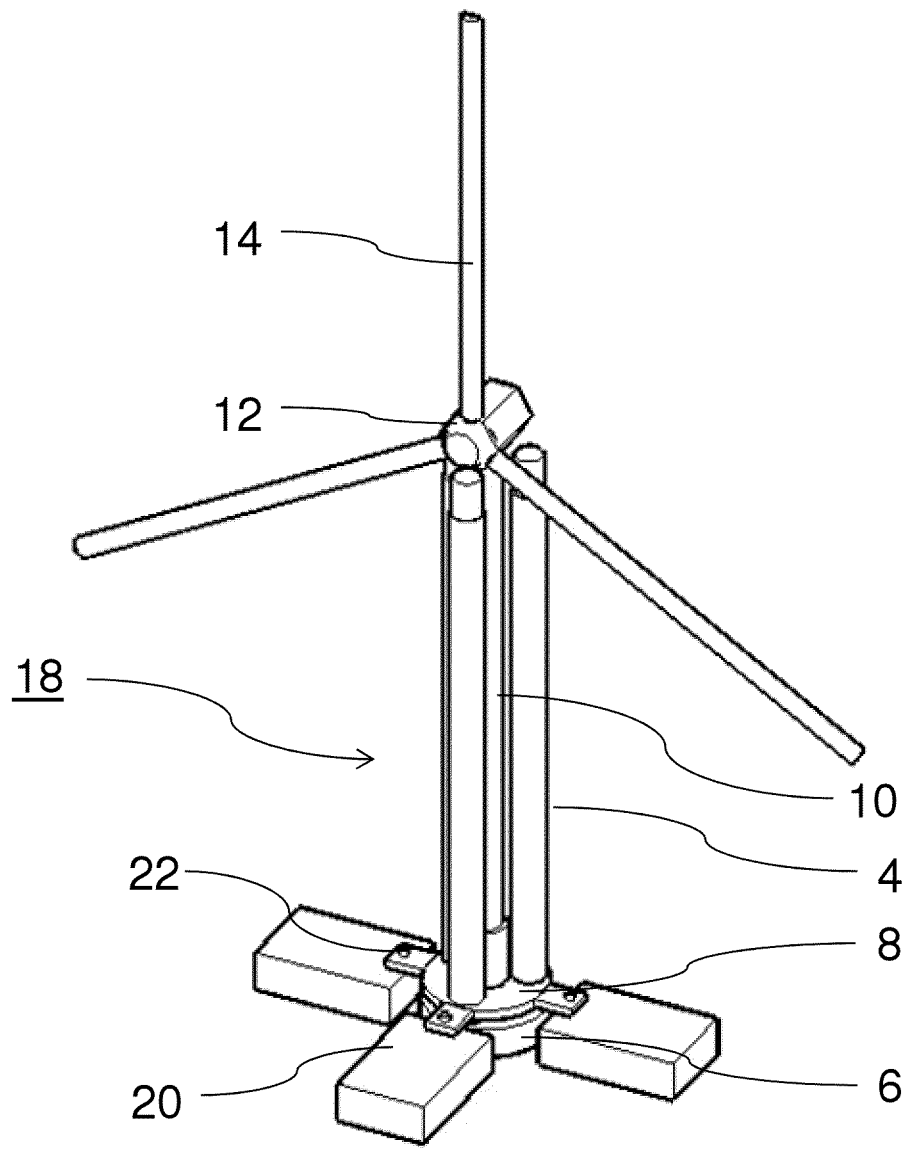
FIG. 8 illustrates a perspective view of the present invention of a vertically installed Spar-type floating wind turbine system in temporary sea-towing configuration including the temporary stability tanks attached to the top deck according to some embodiments of the present invention.

In the preferred embodiment, the floating wind turbine system 2 as illustrated in FIG. 5 can be configured into a temporary sea-towing configuration 18 as illustrated in FIG. 8 by allowing the columns 4 to retract upward from the top deck 8. Specifically, with reference to FIG. 8, a floating wind turbine system in temporary sea-towing configuration 18 includes a plurality of vertically extending columns 4; a ballast tank 6 coupled to the bottom end of each of the columns 4; a top deck 8 located on top of the ballast tank 6, coupled to the bottom part of the columns 4; a wind turbine tower assembly, comprising a tower 10, a nacelle 12 and rotor blades 14, supported vertically by the top deck 8; a plurality of stability tanks 20, and a locking and release system 22 composing pins linking each of the stability tanks 20 to the top deck 8. The locking and release system 22 pins can be removed in a relative short time, typically in less than 60 seconds, to allow separation of the stability tank 20 from the top deck 8 during offshore installation.

Figure 9:
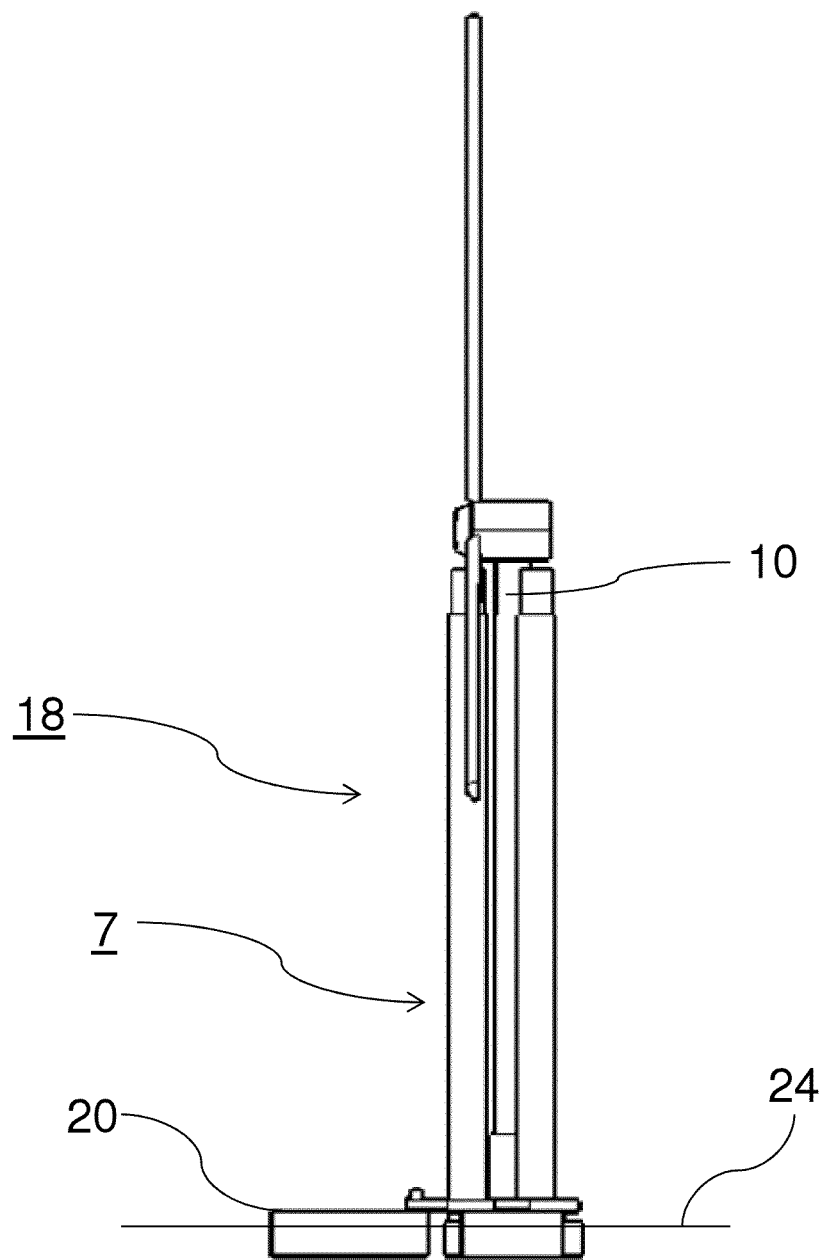
FIG. 9 illustrates a side view of the vertically installed Spar-type floating wind turbine system in temporary sea-towing configuration in which the columns are retracted upward in the air and the floater hull comprising the extending columns and the ballast tank is shown having a shallow draft according to some embodiments of the present invention.

With reference to FIG. 9, which illustrates a side view of the floating wind turbine 18 in sea-towing configuration, in which the towing water level 24 is in the range of 8 to 10 meters above the bottom of the ballast tank 6 with the columns 4 extracted upward above the water line.

Figure 10:
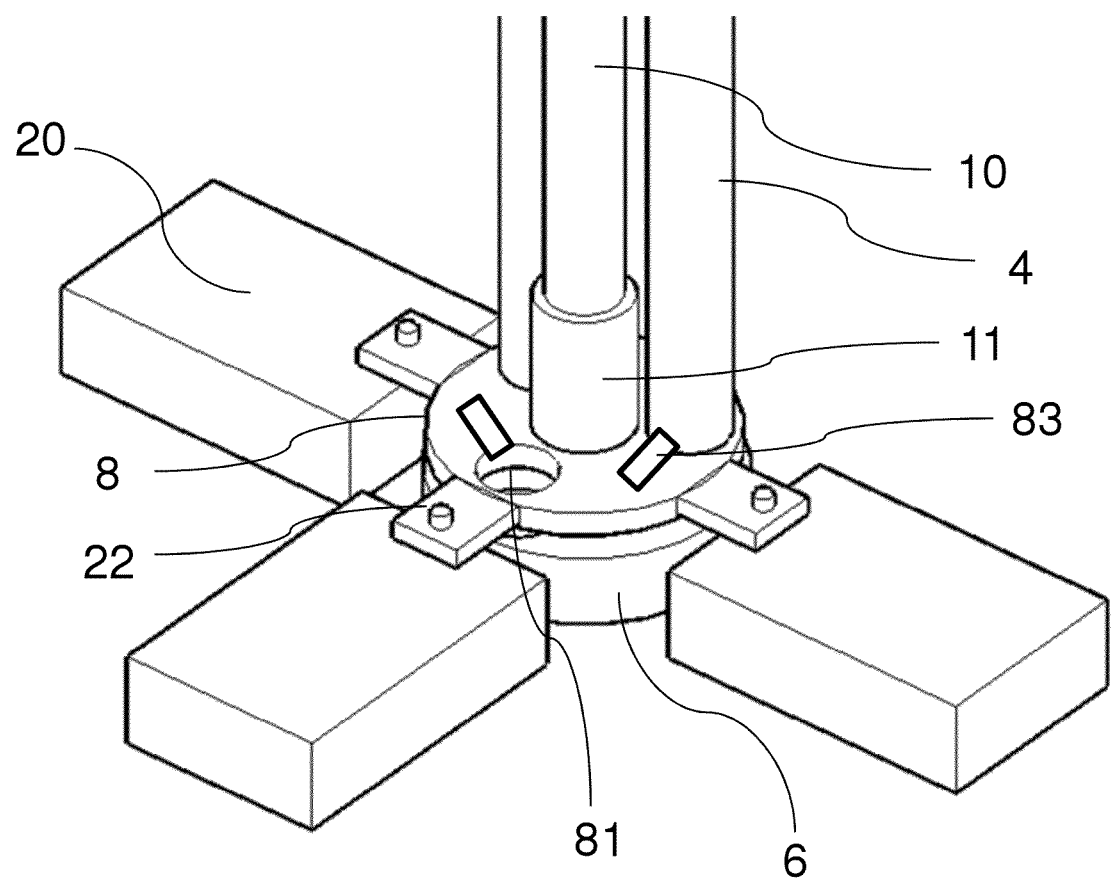
FIG. 10 illustrates an enlarged view of the top deck of the floating wind turbine system in temporary sea-towing configuration including a plurality of through-bores approximate its periphery, deck guiding and locking system, stability tanks with locking and release system according to some embodiments of the present invention.
Figure 11A:
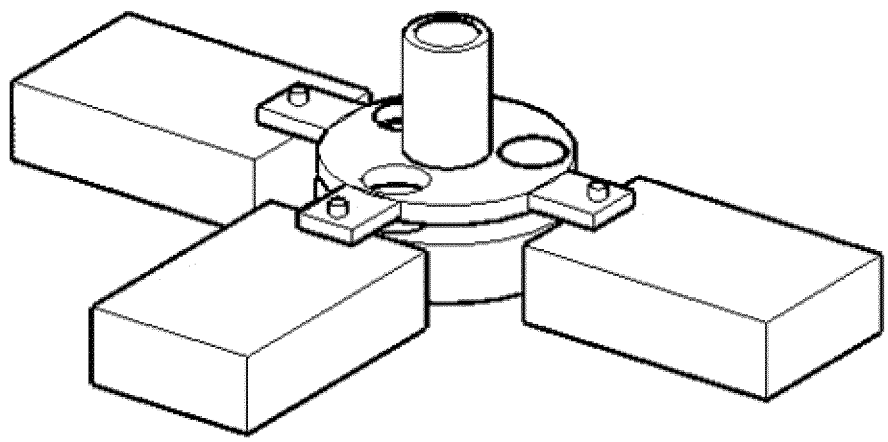
FIGS. 11A to 11D illustrates the quayside construction method and assembly sequence of the vertically installed Spar-type floating wind turbine system according to some embodiments of the present invention.
Figure 11B:
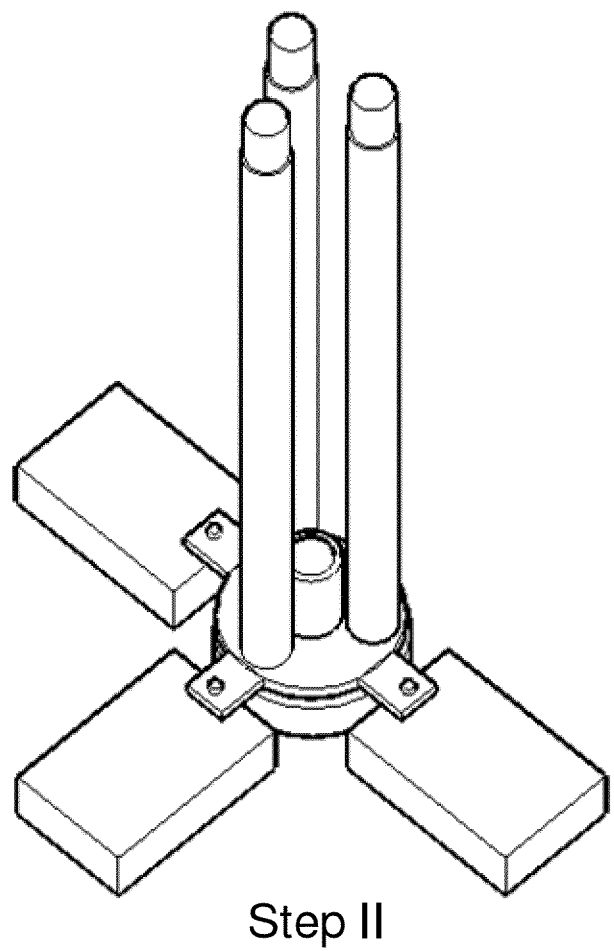
Figure 11C:
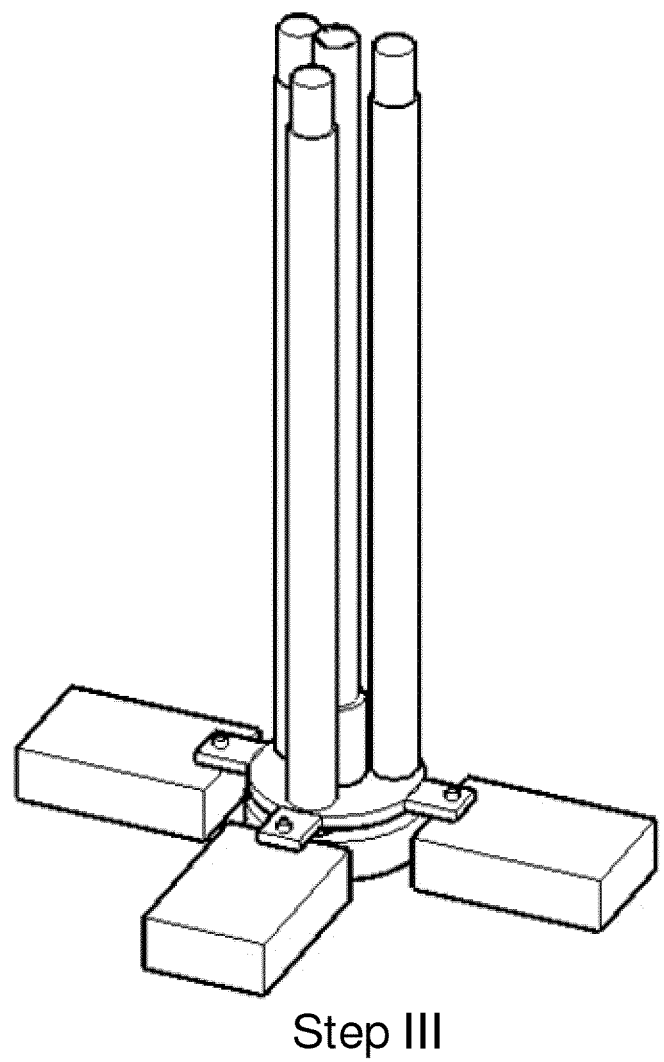
Figure 11D:
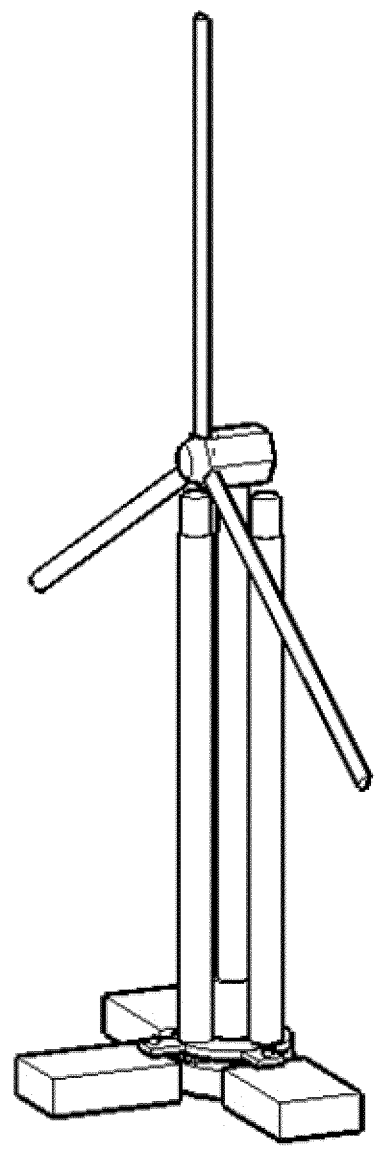
Figure 12A:
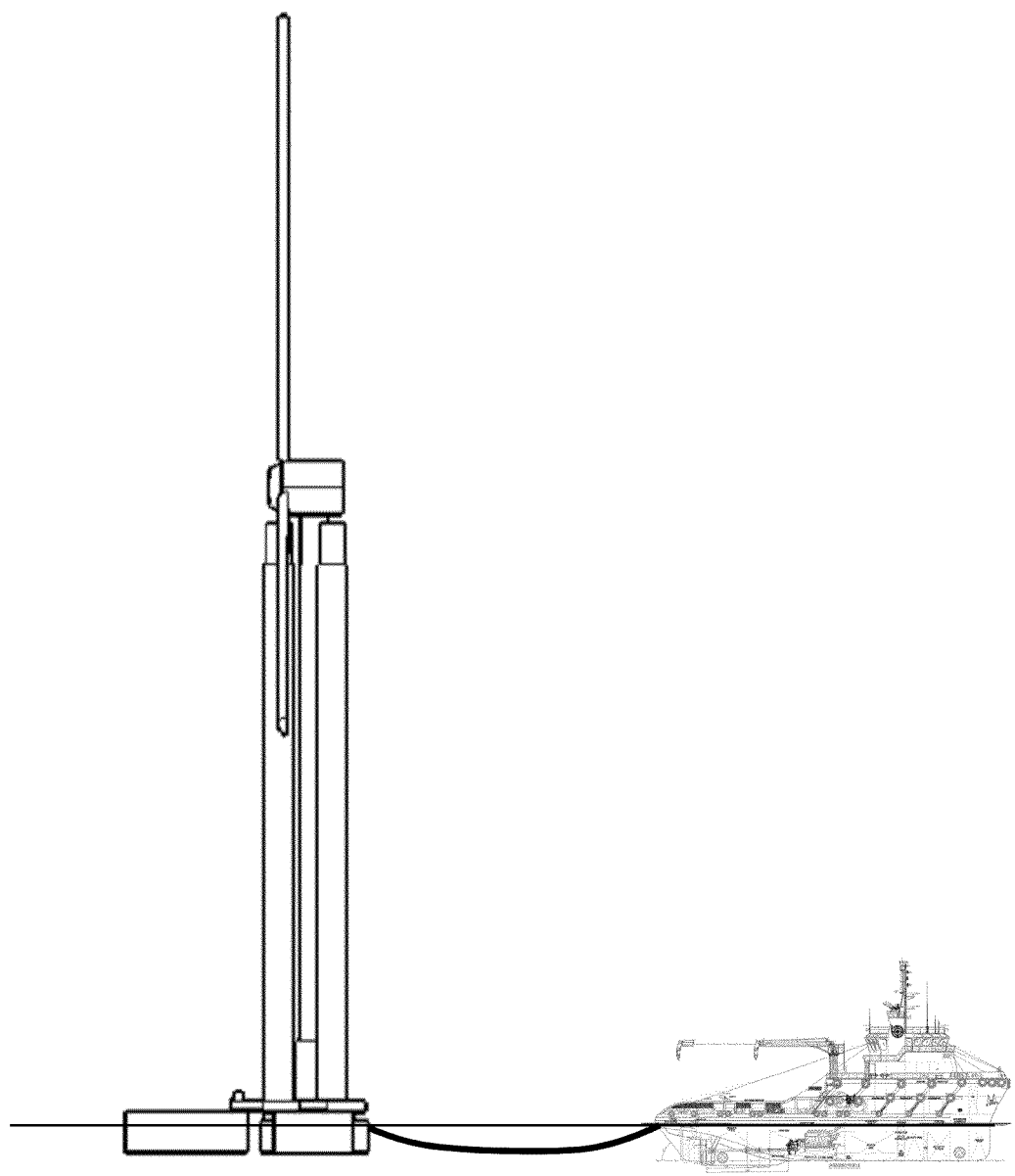
FIG. 12A to 12D illustrates the offshore installation method and installation sequence of the vertically installed Spar-type floating wind turbine system at an offshore wind farm site according to some embodiments of the present invention.
Figure 12B:
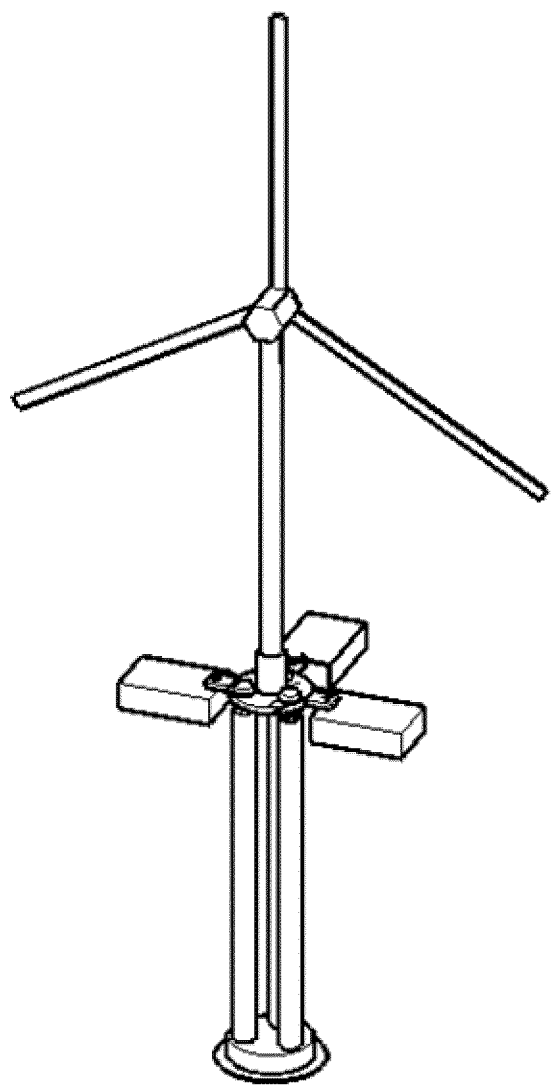
Figure 12C:
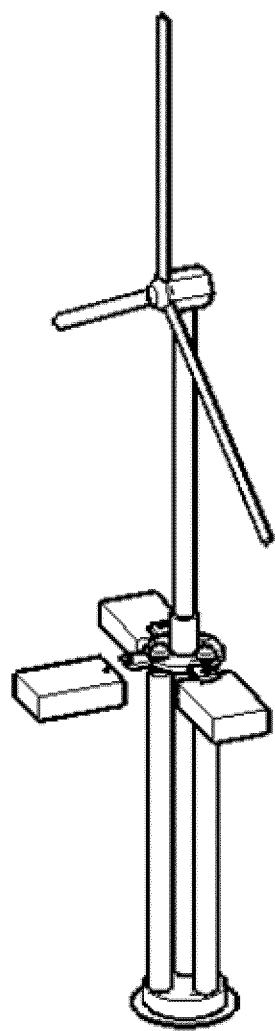
Figure 12D:
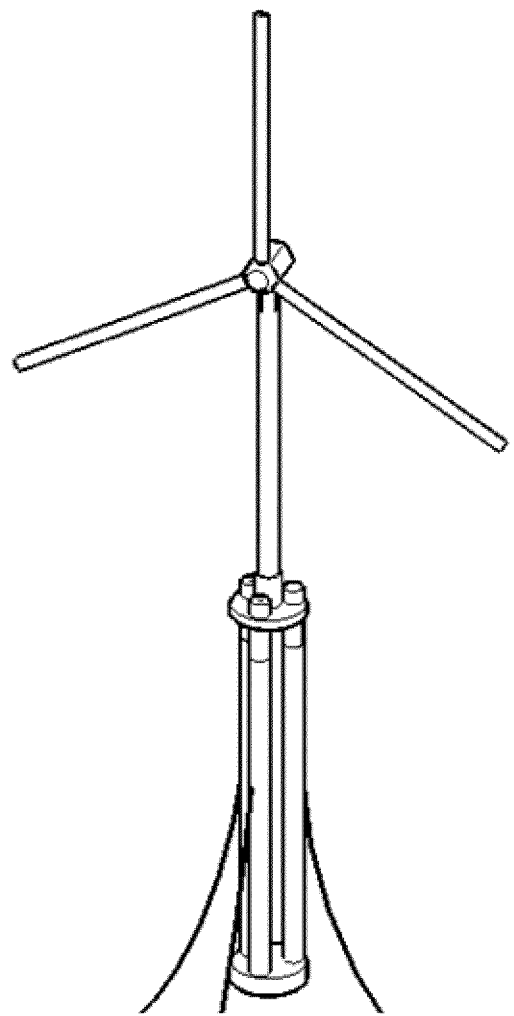

With reference to FIG. 10, the periphery through-bores 81 as illustrated (column omitted for clarity), allows the columns 4 to move through downward by gravity during offshore installation, at which the bottom part of each of the columns 4 is connected for the temporary sea-towing configuration 18. The top deck 8 is preferred to be above the sea level during the sea-towing with equipment (not shown) mounted on its top surface for offshore installation. The function of the stability tanks 20 is to provide stability during the vertical sea-towing and the lowering of the ballast tank 6 coupled to the bottom end of each of the columns 4 at the offshore site. While FIG. 8 shows there are three stability tanks 20 each having a set of lock and release system 22, the present invention is not limited to the illustrated arrangement. Other stability tank and towing configurations such as, but not limited to, a single stability tank configuration, two stability tank configuration, four stability tank configuration with similar locking and release devices may also be utilized. The stability tanks 20 can be purposely built or converted from existing marine cargo barges. The locking and release system 22 comprising pins provides the connection between the top deck 8 and the stability tank 20 during the vertical sea-towing and allows separation of the connected bodies when released during removal of the stability tank 20 after the floating wind turbine assembly completes the change of configuration from the sea-towing configuration 18 to the in-service configuration 2.

With reference to FIG. 11, the quayside construction and assembly sequence of the floating wind turbine system 18 in vertical sea-towing configuration is described. Step I shows the ballast tank 6 is first put on the water and secured by temporary mooring to a quayside (not shown), then the top deck 8 is put on top of the ballast tank 6. Step II shows the stability tanks 20 are connected to the top deck 8 and the columns 4 retracted upward through the periphery through-bores 81 and the wind turbine tower 10 coupled to the support structure 11 of the top deck 8. In Step II, the columns 4 and the turbine tower 10 can be lifted by a conventional land crane at the quay and put on the top deck 8 one by one either in single piece or several segments. Temporary construction struts (not shown) can be used to provide stability for the extended columns 4. Step III shows the nacelle 12 and rotor blades 14 are lifted by a conventional land crane (not shown) and mounted on the turbine tower 10. In Step III, the nacelle 12 and rotor blades 14 can also be lifted separately one by one in a conventional way for wind turbine assembly. Step IV shows the floating wind turbine system in sea-towing configuration 18 is completely assembled at quayside. In addition to the locking and release system pins 22, conventional temporary sea-fastenings are provided to form a rigidly-connected assembly for sea-towing. Solid ballast is then put into the ballast tank 6 at the quayside. The floating wind turbine system in sea-towing configuration 18 is ready to be towed to offshore wind farm site.

With reference to FIG. 12, the sea-towing and installation sequence converting the floating wind turbine system from the sea-towing configuration 18 into the operating configuration 2 are described. Continuing from above Step IV, Step V shows the floating wind turbine system in sea-towing configuration 18 is towed vertically by a conventional tug boat (not shown) to the offshore wind farm site. Step VI shows the floating wind turbine system in sea-towing configuration 18 is being transformed into the operating configuration 2 by lowering the columns 4 vertically under gravity through the periphery through-bores 81 in the top deck 8. In this step, the stability tanks 20 are still connected to the top deck 8 to provide stability for the entire assembly. The temporary sea-fastenings for coupling the columns 4 to the top deck 8 are removed and the deck locking system 83 released. The sub-assembly of the ballast tank 6 coupled to the bottom end of each of the columns 4 moves downward vertically under gravity to a draft at which the weight and buoyancy reach equilibrium. Ballast water is pumped into the columns 4 for further lowering the ballast tank 6 to the final draft at which the top end of each of the columns 41 is just above the top deck 8 at a pre-determined elevation for final connection. Permanent connections are made between the top deck 8 and the columns 4. Step VII shows the stability tank 20 is being moved away from the top deck 8 by a tug boat (not shown). The locking and release system pin 22 is removed to create separation between the stability tank 20 and the top deck 8 allowing the tug boat (not shown) to pull the stability tank 20 away. Step VIII shows the pre-installed mooring lines are hooked up to the floating wind turbine system 2 in operating configuration.

The above figures and description are preferred embodiments of the present invention and preferred main steps of the construction methods and assembly sequences for quayside assembly and offshore towing and installation. All modifications, equivalents, and alternatives to the above preferred embodiments are to be covered in the character and scope of the present invention.

What is claimed is:

1. A method of vertically assembling, vertically towing and installing a floating system, comprising
    a plurality of vertically extending slender columns, each column being buoyant;
    a ballast tank coupled to the bottom end, which is the submerged end, of each of the columns;
    a top deck having a plurality of through-bores approximate its periphery;
    a wind turbine assembly, comprising a tower, a nacelle and rotor blades, supported by said top deck;
    a temporary stability tank or a plurality of temporary stability tanks coupled to said top deck;
    a locking and release system linking each said temporary stability tank to said top deck;
    the method comprising:
    Step I: putting said ballast tank on the water and setting said top deck on the top of said ballast tank at a quayside; coupling each of said temporary stability tanks to a side of said top deck in a horizontal arrangement using temporary sea-fastenings and said locking and release system;
    Step II: extending each of said columns upward through each of said through-bores of said top deck; coupling the bottom end of each of said columns to said ballast tank Step III: coupling the bottom end of said tower of said wind turbine assembly to said top deck; coupling said nacelle and rotor blades to the top end of said tower of said wind turbine assembly in upright position;

Step IV: coupling said top deck using temporary sea-fastenings to each of said columns, whereby said wind turbine assembly, said top deck, said columns, said ballast tank, said temporary stability tanks, and said locking and release system form a sea-towing assembly; inputting a quantity of solid ballast material to said ballast tank.

2. A method of vertically assembling, vertically towing and installing a floating system in accordance with claim 1 further comprising:

Step V: towing vertically said sea-towing assembly to an offshore wind farm site;

Step VI: removing said temporary sea-fastenings between said top deck and columns and allowing said ballast tank coupled to the bottom end of each of said columns to move downward freely under gravity to a draft when the weight and buoyancy reaches equilibrium; further allowing the top end of each of said columns to move downward to reach a pre-determined elevation approximate to said top deck by inputting a ballast material into said columns; permanently coupling the top end of each of said columns to said top deck.

3. A method of vertically assembling, vertically towing and installing a floating system in accordance with claim 2, further comprising:

Step VII: removing said temporary sea-fastenings and said locking and release system to create separation between said top deck and each of said temporary stability tanks; pulling away each of said temporary stability tanks by using a tug boat;

Step VIII: coupling said floating system with a plurality of catenary mooring lines to the sea floor, whereby said floating system is installed for wind power generating configuration, i.e. in in-service configuration at a draft of 80 to 120 meters with said ballast tank containing high density solid material of large quantity causing the center of gravity of said floating system below its center of buoyancy in the vertical direction for stability.

* * * * *